US012685321B1

(12) United States Patent
Afridi et al.

(10) Patent No.: US 12,685,321 B1
(45) Date of Patent: Jul. 21, 2026

(54) PLANT-BASED MATERIALS, AND ASSOCIATED FORMULAS, COMPOSITIONS, PROFILES, BLENDS, AND APPLICATIONS

(71) Applicant: Brothers Global, Salt Lake City, UT (US)

(72) Inventors: Adnan Afridi, Herriman, UT (US); Andrew S. Hoover, Salt Lake City, UT (US); Abdul R. Afridi, Salt Lake City, UT (US)

( * ) Notice: Subject to any disclaimer, the term of this patent is extended or adjusted under 35 U.S.C. 154(b) by 0 days.

(21) Appl. No.: 19/304,210

(22) Filed: Aug. 19, 2025

Related U.S. Application Data

(60) Provisional application No. 63/777,874, filed on Mar. 26, 2025.

(51) Int. Cl.
*A23D 9/007* (2006.01)
*A23D 9/04* (2006.01)

(52) U.S. Cl.
CPC ............... *A23D 9/007* (2013.01); *A23D 9/04* (2013.01)

(58) Field of Classification Search
CPC ..................................................... A23D 9/007
See application file for complete search history.

(56) References Cited

U.S. PATENT DOCUMENTS

| | | | | |
|---|---|---|---|---|
| 6,517,883 B1 * | 2/2003 | Herslof | ..................... | A61P 3/10 426/2 |
| 2009/0264520 A1 * | 10/2009 | Bhagat | .................... | A61P 35/00 514/458 |
| 2014/0342048 A1 * | 11/2014 | Chang | .................. | A61K 31/439 426/589 |

OTHER PUBLICATIONS

Koohikamali, S., and Alam, M. S., "Improvement in nutritional quality and thermal stability of palm olein blended with macadamia oil for deep-fat frying application," J. Food Sci. Technol., (Nov. 2019) 56(11):5063-5073 (Year: 2019).*

* cited by examiner

*Primary Examiner* — Jeffrey P Mornhinweg
(74) *Attorney, Agent, or Firm* — TraskBritt

(57) ABSTRACT

A plant-based product is disclosed and comprises a mixture of oils and butters. The mixture of oils and butters includes refined palm oil and macadamia nut oil. The refined palm oil is present in a weight percentage of the mixture of oils and butters of from about 35% to about 50%. The macadamia nut oil is present in a weight percentage of the mixture of oils and butters of from about 15% to about 25%.

12 Claims, No Drawings

PLANT-BASED MATERIALS, AND ASSOCIATED FORMULAS, COMPOSITIONS, PROFILES, BLENDS, AND APPLICATIONS

CROSS-REFERENCE TO RELATED APPLICATION

This application claims the benefit under 35 U.S.C. § 119 (e) of U.S. Provisional Patent Application Ser. No. 63/777, 874, filed Mar. 26, 2025, the disclosure of which is hereby incorporated herein in its entirety by this reference.

TECHNICAL FIELD

This disclosure relates to plant-based products. More specifically to plant-based products including a mixture of oils and butters, and to related methods.

BACKGROUND

Animal-derived fats, such as beef tallow, pork lard, and mutton tallow, have long been utilized across a range of applications including culinary uses, personal care products, industrial lubricants, and biofuels. These fats are favored for their thermal stability, rich fatty acid profiles, high smoke points, and desirable textural and sensory characteristics. However, growing consumer demand for plant-based alternatives, fueled by concerns related to health, sustainability, and ethical sourcing, has prompted a need for effective substitutes that emulate the performance of animal-based lipids without sacrificing functionality.

Despite increasing availability of plant-based oils and butters, replicating the unique chemical and physical properties of animal fats remains a significant challenge. Many existing alternatives lack the desired combination of saturated fatty acid (SFA) content for solidification, monounsaturated fatty acid (MUFA) content for oxidative stability, and polyunsaturated fatty acid (PUFA) content for nutritional enhancement. Moreover, plant-based compositions often fall short in achieving favorable omega-6 to omega-3 fatty acid ratios, compromising their health benefits. Additionally, achieving high smoke points suitable for high-heat cooking remains an unmet need for many plant-derived fat alternatives.

BRIEF SUMMARY

In one embodiment, a plant-based product is disclosed and comprises a mixture of oils and butters. The mixture of oils and butters includes refined palm oil and macadamia nut oil. The refined palm oil is present in a weight percentage of the mixture of oils and butters of from about 35% to about 50%. The macadamia nut oil is present in a weight percentage of the mixture of oils and butters of from about 15% to about 25%.

In another embodiment, a plant-based product is disclosed and comprises a mixture of oils and butters. In this embodiment, the mixture of oils and butters includes high-oleic olive oil, perilla oil, and avocado oil. The high-oleic olive oil is present in a weight percentage of the mixture of oils and butters of from about 75% to about 85%. The perilla oil is present in a weight percentage of the mixture of oils and butters of from about 10% to about 20%. The avocado oil is present in a weight percentage of the mixture of oils and butters of from about 5% to about 15%.

In another embodiment, a method of producing a plant-based product is disclosed and comprises mixing oils and butters, including refined palm oil, nutmeg butter, and macadamia nut oil, to create a mixture of oils and butters. In the resulting mixture of oils and butters, the refined palm oil is present in a weight percentage of the mixture of oils and butters of from about 35% to about 50%. The macadamia nut oil is present in a weight percentage of the mixture of oils and butters of from about 15% to about 25%.

DETAILED DESCRIPTION

In the Brief Summary above, as well as in the Detailed Description and the claims below, reference is made to particular features (including method acts) of the present disclosure. It is to be understood that the disclosure includes all possible combinations of such particular features. For example, where a particular feature is disclosed in the context of a particular embodiment, or a particular claim, that feature can also be used, to the extent possible, in combination with and/or in the context of other particular aspects and embodiments described herein.

The following description provides specific details, such as components, assembly, and materials in order to provide a thorough description of embodiments of the disclosure. However, a person of ordinary skill in the art will understand that the embodiments of the disclosure may be practiced without employing these specific details.

The use of the term "for example," means that the related description is explanatory, and though the scope of the disclosure is intended to encompass the examples and legal equivalents, the use of such terms is not intended to limit the scope of an embodiment or this disclosure to the specified components, acts, features, functions, or the like.

As used herein, the terms "comprising" and "including," and grammatical equivalents thereof include both open-ended terms that do not exclude additional, unrecited elements or method acts, and more restrictive terms such as "consisting of" and "consisting essentially of" and grammatical equivalents thereof.

As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

As used herein, the singular forms "a," "an," and "the" include the plural forms as well, unless the context clearly indicates otherwise.

As used herein, the term "and/or" includes any and all combinations of one or more of the associated listed items.

As used herein, relational terms, such as "first," "second," etc., are used for clarity and convenience in understanding the disclosure and accompanying drawings and does not connote or depend on any specific preference, orientation, or order, except where the context clearly indicates otherwise.

As used herein, the term "about," when used in reference to a numerical value for a particular parameter, is inclusive of the numerical value and a degree of variance from the numerical value that one of ordinary skill in the art would understand is within acceptable tolerances for the particular parameter. For example, "about," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

Various embodiments disclosed herein relate to plant-based alternatives (e.g., vegan alternatives) to animal tallow (e.g., beef tallow, pork tallow, mutton tallow, and others). Embodiments may be related to various compositions, formulas, profiles, without limitations. Further, various applications, such as, for example, cooking, skincare, cosmetics, lubricants, biofuels, among others, are within the scope of the disclosure. It is noted that various values are provided as examples only, and other values including values that are approximately similar or the same may be within the scope of the disclosure. Various, non-limiting example formulas, compositions, profiles, and applications are described below.

Saturated, monounsaturated, and polyunsaturated fatty acids are types of fats distinguished by their chemical structure and degree of hydrogen saturation. Saturated fatty acids (SFAs) have no double bonds between the carbon atoms in their carbon chains, meaning the hydrocarbon chains are fully "saturated" with hydrogen atoms. This structure makes SFA generally solid at room temperature and commonly found in animal fats, butter, and some tropical oils. Monounsaturated fatty acids (MUFA) contain one double bond between the carbon atoms in their carbon chains, introducing a bend that keeps them generally liquid at room temperature. MUFA are abundant in olive oil, avocados, and certain nuts. Polyunsaturated fatty acids (PUFA) have two or more double bonds between the carbon atoms in their carbon chains, which create multiple bends in the chain that also keeps them generally liquid at room temperature. PUFA are found in high amounts in fatty fish, flaxseeds, walnuts, and sunflower oil.

In general, although SFA are a dense source of energy, a high intake of SFA may lead to elevated levels of low-density lipoprotein (LDL or "bad" cholesterol), which may increase the risk of cardiovascular disease. On the other hand, intake of MUFA and PUFA may help reduce LDL cholesterol and may increase high-density lipoprotein (HDL or "good" cholesterol), which may promote cardiovascular health. However, due to the higher amount of double bonds, MUFA may be more prone to oxidation, which may lead to harmful by-products. Furthermore, omega-3 fatty acids and omega-6 fatty acids are types of PUFA that may enhance the nutritional value of plant-based products. An omega-6 to omega-3 (omega-6:omega-3) ratio of about 1:1 to about 4:1 may be advantageous for healthy consumption.

A first composition for cooking applications, may allow for a blend of plant based oils and butters that maintains a low PUFA content and introduces a balanced omega-6: omega-3 ratio. The first composition may have a formula that includes a combination of refined palm oil, macadamia nut oil, nutmeg butter, refined cocoa butter, refined coconut oil, and chia seed oil. However, the first composition may include different embodiments with additional, or fewer, plant-based oils and butters.

For example, the first composition may include refined palm oil in a weight percentage of total content of from about 25% to about 55%, such as from about 30% to about 50%, or from about 35% to about 45%. In some embodiments, the refined palm oil weight percent in the first composition is 39%.

The first composition may also include macadamia nut oil in a weight percentage of total content of from about 5% to about 35%, such as from about 10% to about 30%, or from about 15% to about 25%. In some embodiments, the macadamia nut oil weight percent in the first composition is 18%.

The first composition may also include nutmeg butter in a weight percentage of total content of from about 0.1% to about 15%, such as from about 0.1% to about 10%, or from about 0.1% to about 5%. In some embodiments, the nutmeg butter weight percent in the first composition is 1%.

The first composition may also include refined cocoa butter in a weight percentage of total content of from about 20% to about 50%, such as from about 25% to about 45%, or from about 30% to about 40%. In some embodiments, the refined cocoa butter weight percent in the first composition is 35%.

The first composition may also include refined coconut oil in a weight percentage of total content of from about 0.1% to about 20%, such as from about 0.5% to about 15%, or from about 1% to about 10%. In some embodiments, the refined coconut oil weight percent in the first composition is 5%.

The first composition may also include chia seed oil in a weight percentage of total content of from about 0.1% to about 20%, such as from about 0.5% to about 15%, or from about 1% to about 10%. In some embodiments, the chia seed oil weight percent in the first composition is 2%.

The combination of vegetable-based oils and/or butters may give the first composition a fatty acid profile including palmitic acid, stearic acid, myristic acid, oleic acid, palmitoleic acid, linoleic acid, alpha-linoleic acid, arachidic acid, eicosenoic acid, and behenic acid. However, the first composition may include different fatty acid profiles with additional, or fewer, fatty acid categories.

For example, the first composition may include palmitic acid in a weight percentage of total content of from about 10% to about 40%, such as from about 15% to about 35%, or from about 20% to about 30%. In some embodiments, the palmitic acid weight percent in the first composition is 26.32%.

The first composition may include stearic acid in a weight percentage of total content of from about 1% to about 30%, such as from about 5% to about 25%, or from about 10% to about 20%. In some embodiments, the stearic acid weight percent in the first composition is 17.25%.

The first composition may include myristic acid in a weight percentage of total content of from about 0.1% to about 20%, such as from about 0.5% to about 15%, or from about 1% to about 10%. In some embodiments, the myristic acid weight percent in the first composition is 1.68%.

The first composition may include oleic acid in a weight percentage of total content of from about 25% to about 55%, such as from about 30% to about 50%, or from about 35% to about 45%. In some embodiments, the oleic acid weight percent in the first composition is 40.04%.

The first composition may include palmitoleic acid in a weight percentage of total content of from about 0.1% to about 20%, such as from about 0.5% to about 15%, or from about 1% to about 10%. In some embodiments, the palmitoleic acid weight percent in the first composition is 2.97%.

The first composition may include linoleic acid in a weight percentage of total content of from about 0.1% to about 20%, such as from about 0.5% to about 15%, or from about 1% to about 10%. In some embodiments, the linoleic acid weight percent in the first composition is 6.01%.

The first composition may include alpha-linoleic acid (ALA) in a weight percentage of total content of from about 0.1% to about 20%, such as from about 0.5% to about 15%, or from about 1% to about 10%. In some embodiments, the ALA weight percent in the first composition is 1.69%.

The first composition may include arachidic acid in a weight percentage of total content of from about 0.1% to about 15%, such as from about 0.1% to about 10%, or from about 0.1% to about 5%. In some embodiments, the arachidic acid weight percent in the first composition is 0.7%.

The first composition may include eicosenoic acid in a weight percentage of total content of from about 0.1% to about 15%, such as from about 0.1% to about 10%, or from about 0.1% to about 5%. In some embodiments, the eicosenoic acid weight percent in the first composition is 0.54%.

The first composition may include behenic acid in a weight percentage of total content of from about 0.1% to about 15%, such as from about 0.1% to about 10%, or from about 0.1% to about 5%. In some embodiments, the behenic acid weight percent in the first composition is 0.45%.

The first composition may also have a second fatty acid profile for the saturated and unsaturated fatty acids that includes a SFA proportion, MUFA proportion, and PUFA proportion.

The first composition may include a SFA proportion with a weight percentage of total content of from about 35% to about 65%, such as from about 40% to about 60%, or from about 45% to about 55%.

The first composition may include a MUFA proportion with a weight percentage of total content of from about 25% to about 55%, such as from about 30% to about 50%, or from about 35% to about 45%.

The first composition may include a PUFA proportion with a weight percentage of total content of from about 1% to about 25%, such as from about 3% to about 20%, or from about 5% to about 10%.

The first composition may also have an omega-6:omega-3 ratio of from about 2:1 to about 5:1, such as from about 2.5:1 to about 4.5.5:1, or from about 3:1 to about 4:1. In some embodiments, the omega-6:omega-3 ratio in the first composition is 3.56:1.

The first composition may also have a smoke point of from about 100° C. to about 300° C., such as from about 150° C. to about 250° C., or from about 175° C. to about 250° C. In some embodiments, the smoke point of the first composition is 215° C.

The SFA and MUFA content in the first composition ensures oxidative stability (which prevents spoiling, rancidification, and loss of nutritional properties) as well as a creamy texture when using the first composition for cooking applications, while the palmitic and stearic content ensure stable solidification properties. The addition of chia seed oil to the first composition results in a higher PUFA content that may help raise the smoke point of the first composition slightly (+10° C.) while still maintaining suitability for cooking. Even though a higher PUFA content may also slightly reduce the oxidative stability of the first composition, the smoke point of the first composition remains adequate for most cooking needs. Chia seed oil also includes ALA, therefore, the addition of chia seed oil to the first composition helps achieve an omega-6:omega-3 ratio that enhances nutritional value without compromising functionality. Formulas disclosed herein may introduce, for example, approximately 1.69% ALA to achieve a near-ideal 3.56:1 omega-6:omega-3 ratio. It is noted that various elements (e.g., butters/oils) may be varied to achieve a desired fatty acid profile for the first composition. In addition, flavors (e.g., natural or otherwise) may be modified (e.g., removed or added) in the first composition to mimic the flavor of animal fat.

The types and proportions of plant-based oils and/or butters that make up the first composition may depend on substantially matching the fatty acid profile, as well as the SFA, MUFA, and PUFA proportions, of animal fats used for cooking (e.g., animal tallow). Thus, the first composition may emulate the functional cooking properties of animal fats, prioritizing oxidative stability, smoke point, and a tighter omega-6:3 ratio. Adjustments (e.g., less chia seed oil for cooking) could further refine the profiles of the first composition based on specific needs, with numerous plant-based oils that can be substituted in the first composition to create different blends.

A second composition for skincare applications, may allow for a blend of plant based oils and butters that maintains moisturizing and protective qualities for topical use. This second composition has a focus on maintaining a similar SFA/MUFA balance to that in the first composition and has an added omega-3 boost for anti-aging and skin elasticity benefits. The second composition may have a formula that includes a combination of refined palm oil, shea butter, macadamia nut oil, refined illipe butter, refined kokum butter, and camelina seed oil. However, the second composition may include different compositions with additional, or fewer, plant-based oils and butters.

For example, the second composition may include refined palm oil in a weight percentage of total content of from about 30% to about 60%, such as from about 35% to about 55%, or from about 40% to about 50%. In some embodiments, the refined palm oil weight percent in the first composition is 46%.

The second composition may also include shea butter in a weight percentage of total content of from about 0.1% to about 20%, such as from about 0.5% to about 15%, or from about 1% to about 10%. In some embodiments, the shea butter weight percent in the first composition is 8%.

The second composition may also include macadamia nut oil in a weight percentage of total content of from about 5% to about 35%, such as from about 10% to about 30%, or from about 15% to about 25%. In some embodiments, the macadamia nut oil weight percent in the first composition is 18%.

The second composition may also include refined illipe butter in a weight percentage of total content of from about 1% to about 25%, such as from about 1% to about 20%, or from about 5% to about 15%. In some embodiments, the refined illipe oil weight percent in the first composition is 10%.

The second composition may also include refined kokum butter in a weight percentage of total content of from about 1% to about 30%, such as from about 5% to about 25%, or from about 10% to about 20%. In some embodiments, the refined kokum butter weight percent in the first composition is 14%.

The second composition may also include camelina seed oil in a weight percentage of total content of from about 0.1% to about 20%, such as from about 0.5% to about 15%, or from about 1% to about 10%. In some embodiments, the camelina seed oil weight percent in the first composition is 4%.

The combination of plant-based oils and/or butters may give the second composition a fatty acid profile including palmitic acid, stearic acid, oleic acid, linoleic acid, and ALA, arachidic, eicosenoic, and behenic. However, the second composition may include different fatty acid profiles with additional, or fewer, fatty acid categories.

For example, the second composition may include palmitic acid in a weight percentage of total content of from about 10% to about 40%, such as from about 15% to about 35%, or from about 20% to about 30%. In some embodiments, the palmitic acid weight percent in the second composition is 25.71%.

The second composition may include stearic acid in a weight percentage of total content of from about 1% to about 30%, such as from about 5% to about 25%, or from about 10% to about 20%. In some embodiments, the stearic acid weight percent in the second composition is 16.89%.

The second composition may include oleic acid in a weight percentage of total content of from about 30% to about 60%, such as from about 35% to about 55%, or from about 40% to about 50%. In some embodiments, the oleic acid weight percent in the second composition is 43.29%.

The second composition may include linoleic acid in a weight percentage of total content of from about 0.1% to about 20%, such as from about 0.5% to about 15%, or from about 1% to about 10%. In some embodiments, the linoleic acid weight percent in the second composition is 7.71%.

The second composition may include ALA in a weight percentage of total content of from about 0.1% to about 20%, such as from about 0.5% to about 15%, or from about 1% to about 10%. In some embodiments, the ALA weight percent in the second composition is 2.05%.

The first composition may include arachidic acid in a weight percentage of total content of from about 0.1% to about 15%, such as from about 0.1% to about 10%, or from about 0.1% to about 5%. In some embodiments, the arachidic acid weight percent in the first composition is 0.49%.

The first composition may include eicosenoic acid in a weight percentage of total content of from about 0.1% to about 15%, such as from about 0.1% to about 10%, or from about 0.1% to about 5%. In some embodiments, the eicosenoic acid weight percent in the first composition is 0.54%.

The first composition may include behenic acid in a weight percentage of total content of from about 0.1% to about 15%, such as from about 0.1% to about 10%, or from about 0.1% to about 5%. In some embodiments, the behenic acid weight percent in the first composition is 0.45%.

The second composition formula may also have a second fatty acid profile for the saturated and unsaturated fatty acids that includes a SFA proportion, MUFA proportion, and PUFA proportion.

The second composition may include a SFA proportion with a weight percentage of total content of from about 35% to about 65%, such as from about 40% to about 60%, or from about 45% to about 55%.

The second composition may include a MUFA proportion with a weight percentage of total content of from about 30% to about 60%, such as from about 35% to about 55%, or from about 40% to about 50%.

The second composition may include a PUFA proportion with a weight percentage of total content of from about 0.1% to about 15%, such as from about 0.5% to about 10%, or from about 1% to about 3%.

The second composition may also have an omega-6: omega-3 ratio of from about 2:1 to about 5:1, such as from about 2.5:1 to about 4.5:1, or from about 3:1 to about 4:1. In some embodiments, the omega-6:omega-3 ratio in the second composition is 3.75:1.

The second composition may also have a smoke point of from about 100° C. to about 300° C., such as from about 150° C. to about 250° C., or from about 175° C. to about 250° C. In some embodiments, the smoke point of the second composition is 221° C.

The SFA and MUFA content in the second composition ensure a solid-yet-emollient texture ideal for balms or creams. The second composition may have a higher PUFA content when compared to the first composition due to the presence of ALA from camelina oil, enhancing skin benefits. It is noted that various elements (e.g., oils and butters) may be varied to achieve desired fatty acids. An elevated PUFA content in the second composition may increase oxidation risks over time. However, if the second composition is used for skincare applications, heat stability may be less significant and may, instead, be offset by a nutritional boost.

Embodiments of the second composition may provide an omega-3 advantage. More specifically, the second composition may add ALA for general and skin health. For example, some embodiments of the second composition may add 2.05 wt % ALA, yielding a 3.75:1 omega-6: omega-3 ratio. When compared to the first composition, the second composition may introduce anti-aging and elasticity benefits by using different plant based oils and/or butters, aligning with skincare goals.

The types and proportions of plant-based oils and/or butters that make up the second composition may depend on substantially matching the fatty acid profile, as well as the SFA, MUFA, and PUFA proportions, of animal fats used for skincare (e.g., animal tallow). Thus, the second composition may emulate the functional skincare properties of animal fats, prioritizing texture, emollience, and skin health. Adjustments (e.g., more camelina oil) could further refine the profiles of the first composition based on specific needs, with numerous plant-based oils that can be substituted in the first composition to create different blends.

A third composition for cooking applications may allow for a blend of plant based oils and butters that minimizes SFA, maximizes MUFA, and/or minimizes PUFA, while at the same time increasing the concentration of omega-3 to have an omega-3 to omega-6 ratio higher than 1:1, such that the concentration of omega-3 is higher than that of omega-6. The third composition may be healthy to cook and better for human consumption, and with increased stability and performance in high-heat applications (e.g., frying, baking). The third composition may have a formula that includes a combination of high-oleic olive oil, perilla oil, and avocado oil. However, the third composition may include different configurations with additional, or fewer, plant-based oils and butters.

For example, the third composition may include high-oleic olive oil in a weight percentage of total content of from about 65% to about 95%, such as from about 70% to about 90%, or from about 75% to about 85%. In some embodiments, the high-oleic olive oil weight percent in the third composition is 80%.

The third composition may include perilla oil in a weight percentage of total content of from about 1% to about 30%, such as from about 5% to about 25%, or from about 10% to about 20%. In some embodiments, the perilla oil weight percent in the third composition is 12%.

The third composition may include avocado oil in a weight percentage of total content of from about 0.5% to about 25%, such as from about 1% to about 20%, or from about 5% to about 15%. In some embodiments, the perilla oil weight percent in the third composition is 8%.

The third composition may also have a fatty acid profile for the saturated and unsaturated fatty acids that includes a SFA proportion, MUFA proportion, and PUFA proportion.

The third composition may include a SFA proportion with a weight percentage of total content of from about 1% to about 30%, such as from about 5% to about 25%, or from about 10% to about 20%. In some embodiments, the SFA weight percent in the third composition is 13%.

The third composition may include a MUFA proportion with a weight percentage of total content of from about 55% to about 85%, such as from about 60% to about 80%, or from about 65% to about 75%. In some embodiments, the MUFA weight percent in the third composition is 71.16%.

The third composition may include a PUFA proportion with a weight percentage of total content of from about 1% to about 30%, such as from about 5% to about 25%, or from about 10% to about 20%. In some embodiments, the PUFA weight percent in the third composition is 12.24%.

The third composition may also have an omega-6: omega-3 ratio of from about 1:1 to about 1:6, such as from about 1:1 to about 1:4, or from about 1:1 to about 1:2. In some embodiments, the omega-6:omega-3 ratio in the third composition is 1.15:1.

The third composition may also have a smoke point of from about 100° C. to about 300° C., such as from about 150° C. to about 250° C., or from about 175° C. to about 250° C. In some embodiments, the smoke point of the third composition is 236° C.

The third composition may have a slightly higher SFA content, higher MUFA content, lower PUFA content, and a better omega-3:omega-6 ratio than, for example, canola oil. Thus, the third composition may be more stable (e.g., less prone to oxidation), making the third composition better for inflammation-sensitive diets. Furthermore, the third composition may have a higher smoking point that, along with the lower PUFA content, make the third composition better for high-heat cooking than, for example, canola oil.

The embodiments of the disclosure described above do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A plant-based product comprising:
a mixture of oils and butters, wherein the mixture of oils and butters comprises a fatty acid profile comprising:
alpha-linolenic acid (ALA) in a weight percentage of the mixture of oils and butters of from about 1% to about 10%;
stearic acid in a weight percentage of the mixture of oils and butters of from about 10% to about 20%;
oleic acid in a weight percentage of the mixture of oils and butters of from about 35% to about 45%;
palmitic acid in a weight percentage of the mixture of oils and butters of from about 20% to about 30%;
linoleic acid in a weight percentage of the mixture of oils and butters of from about 1% to about 10%;
wherein the mixture of oils and butters comprises an omega-6:omega-3 ratio of from about 2:1 to about 4:1;

wherein the mixture of oils and butters comprises a smoke point of from about 100° C. to about 300° C.;
wherein the mixture of oils and butters emulates functional cooking properties of animal tallow; and
wherein the mixture of oils and butters substantially matches a fatty acid profile and saturated fatty acid, monounsaturated fatty acid, and polyunsaturated fatty acid proportions of animal tallow used for cooking.

2. The plant-based product of claim 1, wherein the mixture of oils and butters further comprises:
refined palm oil in a weight percentage of the mixture of oils and butters of from about 35% to about 50%; and
macadamia nut oil in a weight percentage of the mixture of oils and butters from about 15% to about 25%.

3. The plant-based product of claim 2, wherein the mixture of oils and butters further comprises:
nutmeg butter in a weight percentage of the mixture of oils and butters of from about 0.1% to about 5%;
refined cocoa butter in a weight percentage of the mixture of oils and butters of from about 30% to about 40%;
refined coconut oil in a weight percentage of the mixture of oils and butters of from about 1% to about 10%; and
chia seed oil in a weight percentage of the mixture of oils and butters of from about 1% to about 10%.

4. The plant-based product of claim 2, wherein the mixture of oils and butters further comprises:
shea butter in a weight percentage of the mixture of oils and butters of from about 1% to about 10%;
refined illipe butter in a weight percentage of the mixture of oils and butters of from about 5% to about 15%;
refined kokum butter in a weight percentage of the mixture of oils and butters of from about 10% to about 20%; and
camelina seed oil in a weight percentage of the mixture of oils and butters of from about 1% to about 10%.

5. The plant-based product of claim 4, wherein the mixture of oils and butters further comprises refined palm oil in a weight percentage of the mixture of oils and butters of from about 40% to about 50%.

6. The plant-based product of claim 1, wherein the mixture of oils and butters further comprises:
myristic acid in a weight percentage of the mixture of oils and butters of from about 1% to about 10%;
palmitoleic acid in a weight percentage of the mixture of oils and butters of from about 1% to about 10%;
arachidic acid in a weight percentage of the mixture of oils and butters of from about 0.1% to about 5%;
eicosenoic acid in a weight percentage of the mixture of oils and butters of from about 0.1% to about 5%; and
behenic acid in a weight percentage of the mixture of oils and butters of from about 0.1% to about 5%.

7. The plant-based product of claim 4, wherein the mixture of oils and butters further comprises:
arachidic acid in a weight percentage of the mixture of oils and butters of from about 0.1% to about 5%;
eicosenoic acid in a weight percentage of the mixture of oils and butters of from about 0.1% to about 5%; and
behenic acid in a weight percentage of the mixture of oils and butters of from about 0.1% to about 5%.

8. The plant-based product of claim 2, wherein the mixture of oils and butters comprises a second fatty acid profile including SFA, MUFA, and PUFA proportions, wherein the mixture of oils and butters comprises:
SFA in a weight percentage of the mixture of oils and butters of from about 45% to about 55%;
MUFA in a weight percentage of the mixture of oils and butters of from about 35% to about 45%; and PUFA in a weight percentage of the mixture of oils and butters of from about 5% to about 10%.

9. The plant-based product of claim 4, wherein the mixture of oils and butters comprises a second fatty acid profile including SFA, MUFA, and PUFA proportions, wherein the mixture of oils and butters comprises:

SFA in a weight percentage of the mixture of oils and butters of from about 45% to about 55%;

MUFA in a weight percentage of the mixture of oils and butters of from about 40% to about 50%; and PUFA in a weight percentage of the mixture of oils and butters of from about 1% to about 3%.

10. A method of producing a plant-based product comprising:

mixing oils and butters to make a mixture of oils and butters, the mixture of oils and butters including:

alpha-linolenic acid (ALA) in a weight percentage of the mixture of oils and butters of from about 1% to about 10%;

stearic acid in a weight percentage of the mixture of oils and butters of from about 10% to about 20%;

oleic acid in a weight percentage of the mixture of oils and butters of from about 35% to about 45%;

palmitic acid in a weight percentage of the mixture of oils and butters of from about 20% to about 30%;

linoleic acid in a weight percentage of the mixture of oils and butters of from about 1% to about 10%;

wherein the mixture of oils and butters comprises an omega-6:omega-3 ratio of from about 3:1 to about 4:1;

wherein the mixture of oils and butters comprises a smoke point of from about 175° C. to about 250° C.;

wherein the mixture of oils and butters emulates functional cooking properties of animal tallow; and wherein the mixture of oils and butters substantially matches a fatty acid profile and saturated fatty acid, monounsaturated fatty acid, and polyunsaturated fatty acid proportions of animal tallow used for cooking.

11. The method of claim 10, wherein mixing oils and butters further comprises mixing:

refined palm oil in a weight percentage of the mixture of oils and butters of from about 35% to about 50%;

macadamia nut oil in a weight percentage of the mixture of oils and butters from about 15% to about 25%;

nutmeg butter in a weight percentage of the mixture of oils and butters of from about 0.1% to about 5%;

refined cocoa butter in a weight percentage of the mixture of oils and butters of from about 30% to about 40%;

refined coconut oil in a weight percentage of the mixture of oils and butters of from about 1% to about 10%; and chia seed oil in a weight percentage of the mixture of oils and butters of from about 1% to about 10%.

12. The method of claim 10, wherein mixing oils and butters further comprises mixing:

shea butter in a weight percentage of the mixture of oils and butters of from about 1% to about 10%;

refined illipe butter in a weight percentage of the mixture of oils and butters of from about 5% to about 15%;

refined kokum butter in a weight percentage of the mixture of oils and butters of from about 10% to about 20%; and camelina seed oil in a weight percentage of the mixture of oils and butters of from about 1% to about 10%.

* * * * *